C. S. SHARP.
CULTIVATOR.
APPLICATION FILED DEC. 24, 1917.
1,346,512.
Patented July 13, 1920.
2 SHEETS—SHEET 2.
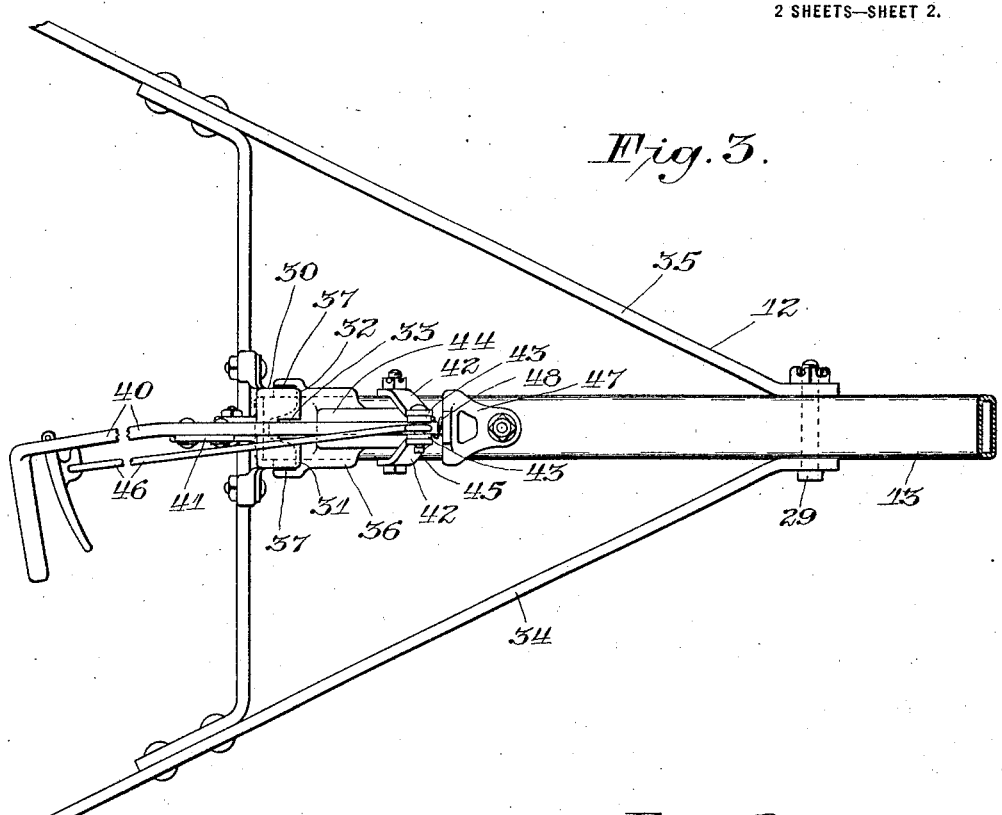
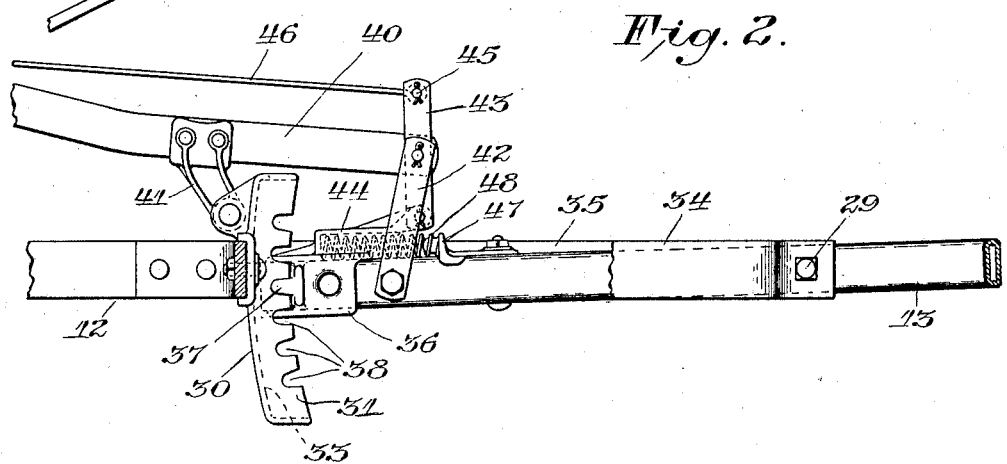
Inventor:
Charles S. Sharp,
By Chas. E. Lord
Atty.

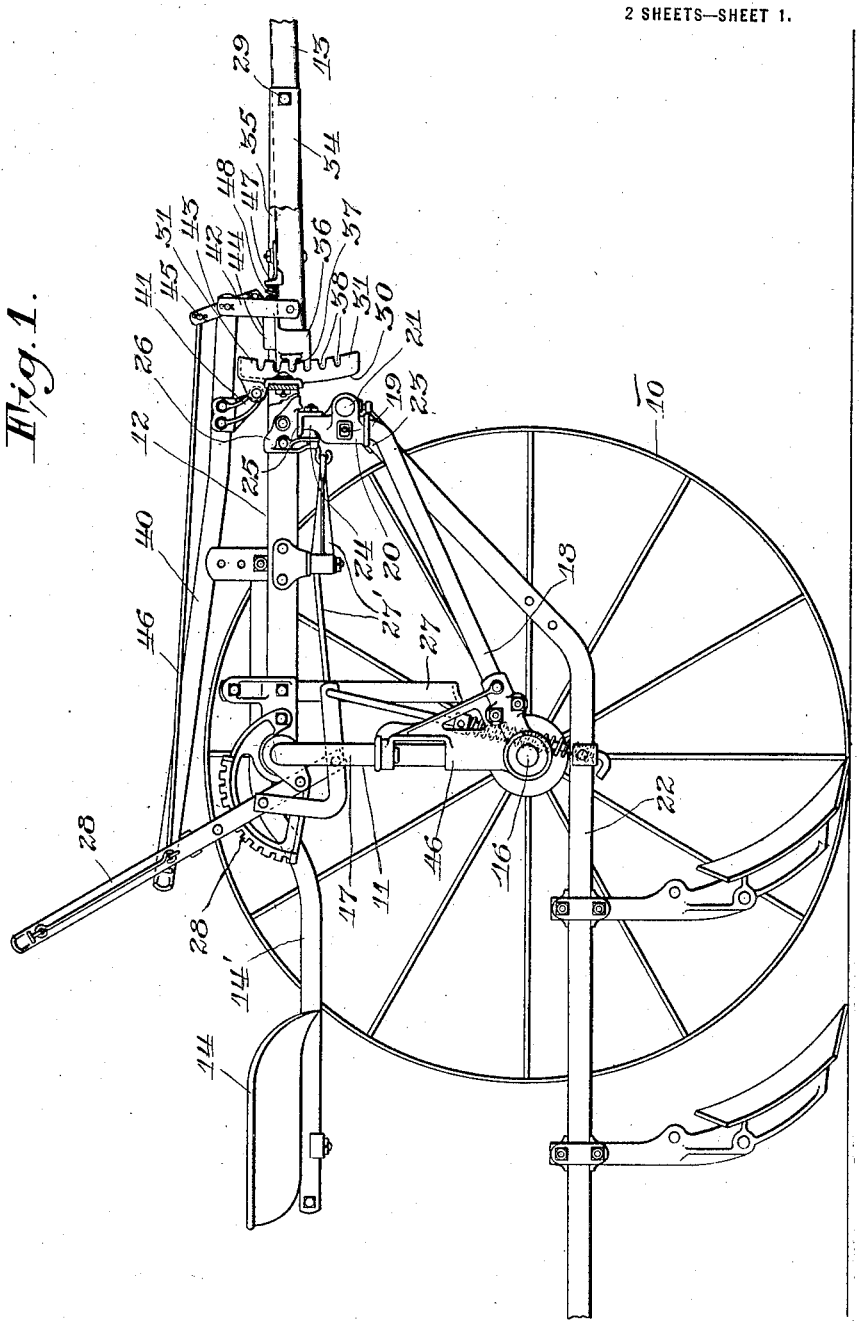

UNITED STATES PATENT OFFICE.

CHARLES S. SHARP, OF AUBURN, NEW YORK, ASSIGNOR, BY MESNE ASSIGNMENTS, TO INTERNATIONAL HARVESTER COMPANY, A CORPORATION OF NEW JERSEY.

CULTIVATOR.

1,346,512.          Specification of Letters Patent.      Patented July 13, 1920.

Application filed December 24, 1917. Serial No. 208,679.

*To all whom it may concern:*

Be it known that I, CHARLES S. SHARP, a citizen of the United States, residing at Auburn, in the county of Cayuga and State of New York, have invented certain new and useful Improvements in Cultivators, of which the following is a full, clear, and exact specification.

My invention relates to cultivators, and more especially to riding cultivators.

One object of my invention is to provide a means for tilting the frame of the cultivator with respect to the tongue from the operator's seat.

Another object is to provide means on the main frame to allow vertical and prevent lateral movement of the tongue.

The invention is illustrated on the accompanying sheets of drawings, in which—

Figure 1 is a side view of a cultivator showing my improvements thereon;

Fig. 2 is a detail side view showing a portion of the main frame and tongue having the tilting lever and segmental guide disposed thereon;

Fig. 3 is a plan view of Fig. 2.

The same reference characters designate like parts throughout the several views.

This cultivator comprises ground wheels 10 pivotally mounted upon an arched axle 11 and supporting a main frame 12, to which is pivotally connected a pole 13, as hereinafter described. A seat 14 is also attached to the frame by supports 14'. The wheels 10 are each carried by a spindle 16, which is mounted on a bracket 16' journaled upon the depending portion 17 of the arched axle 11. This bracket also carries a forwardly and upwardly extending lever 18 terminating in a vertical portion 19. To this vertical portion is pivoted a bearing cap 20 to adjustably receive one end of a transversely arranged beam supporting rod 21. Upon this rod are mounted the shovel carrying beams 22, the heads 23 of which are mounted upon the supporting rod.

For guiding the beam support an upwardly extending lug 24, formed integral with each of the bearing caps 20, is provided, upon which is carried, parallel with the rod 21, a bar 25. The bar 25 is carried in bearings 26 secured to the main frame 12. Foot steering levers 27 are connected to the bar 25 by means of the links 27', so that the operator may cause the bar to shift to either side, thereby turning the wheel supporting bracket 16 on the arch axle 17 by means of the lever 18. The wheels 10 carried by the brackets are thus turned to guide the cultivator, and the wheels are kept in parallelism by means of the bar 25.

The shovel carrying beams may be adjusted vertically by means of levers 28 and quadrants 28', which are mounted on the frame.

The main frame 12 is pivoted at 29 to the tongue 13. Bolted to and centrally located on the main frame is a segment and guide member 30. Said guide member comprises two notched segments 31 and 32 integrally formed, and having an elongated vertical guideway 33 therebetween. The tongue 13 is pivotally connected to and disposed between the forwardly converging bars 34 and 35 of the main frame. On the rear end of the tongue is telescopically mounted a plunger 36, having detents 37, integrally formed therewith, which engage notches 38 of the segments. The rear end of the tongue 13 fits into the guideway 33, the object being to prevent lateral movement of the tongue with respect to said main frame, and to allow vertical movement of said tongue in the guideway.

To tilt the main frame a lever 40 is provided, which is preferably disposed centrally of the machine and is within convenient reach of the driver. This lever carries a depending arm 41, which is pivotally connected to the segment 30. Depending links 42 and 43 are also pivotally connected to the lever 40. Link 42 is pivoted at its lower end to the tongue, while link 43 is pivoted at its lower end to a barrel member 44 forming part of the plunger 36. The upper end of link 43 has a pin 45 passing therethrough, to which is fastened the end of the detent control link 46, said link having the usual thumb latch control. A stop member 47 is bolted on the upper side of the tongue, and carries one end of the detent control spring 48, the other end of which is supported in the barrel member 44, and acts to keep the detents in constant engagement with the segment 30 on the main frame.

Varying conditions of the ground to be cultivated, such as variations in the soil itself, uneven or hilly ground, etc., make it necessary to employ means for quickly adjusting the position of the cultivator beams in addition to the usual raising and lowering levers 28. If the cultivator shovels strike a strip of ground where they run too deep or too shallow, as often happens in going up or down hill, the necessary adjustment of the cultivator beams may be made by the single lever 40. This raises or depresses the forward end of the cultivator, thereby raising or lowering the point from which the cultivator beams are suspended, and hence changing the depth of cultivation.

While I have shown and described but a single embodiment of my invention, it should be understood that the same is capable of modification, and therefore changes may be made without departing from the spirit of the invention or its scope as covered by the appended claims.

What I claim as my invention and desire to secure by Letters Patent is:

1. In a cultivator, a frame, a tongue vertically hinged thereto, means for raising and lowering the tongue with respect to the frame, a segment carried by the frame and forming a guide for the end of the tongue.

2. In a cultivator, a main frame, a tongue, a segment fixed to said main frame, a lever pivotally connected to said main frame, a detent in engagement with said segment, an arm pivoted to said detent and also pivotally connected to said lever, and means to operate said arm to withdraw said detent to allow vertical movement of the main frame with respect to said tongue.

3. In a cultivator, a main frame, a tongue, a segment fixed to said main frame, a lever pivotally connected to said main frame, a detent carried by the tongue in engagement with said segment, an arm pivoted to said detent and also pivotally connected to said lever, and means to operate said arm to withdraw said detent to allow vertical movement of the main frame with respect to said tongue.

4. In a cultivator, a main frame, a plurality of notched segments connected to said main frame, a tongue having its end portion disposed between said segments to prevent lateral movement of said tongue with respect to said frame and means on said tongue to engage said notched segments.

In testimony whereof I affix my signature.

CHARLES S. SHARP.